Patented Jan. 27, 1953

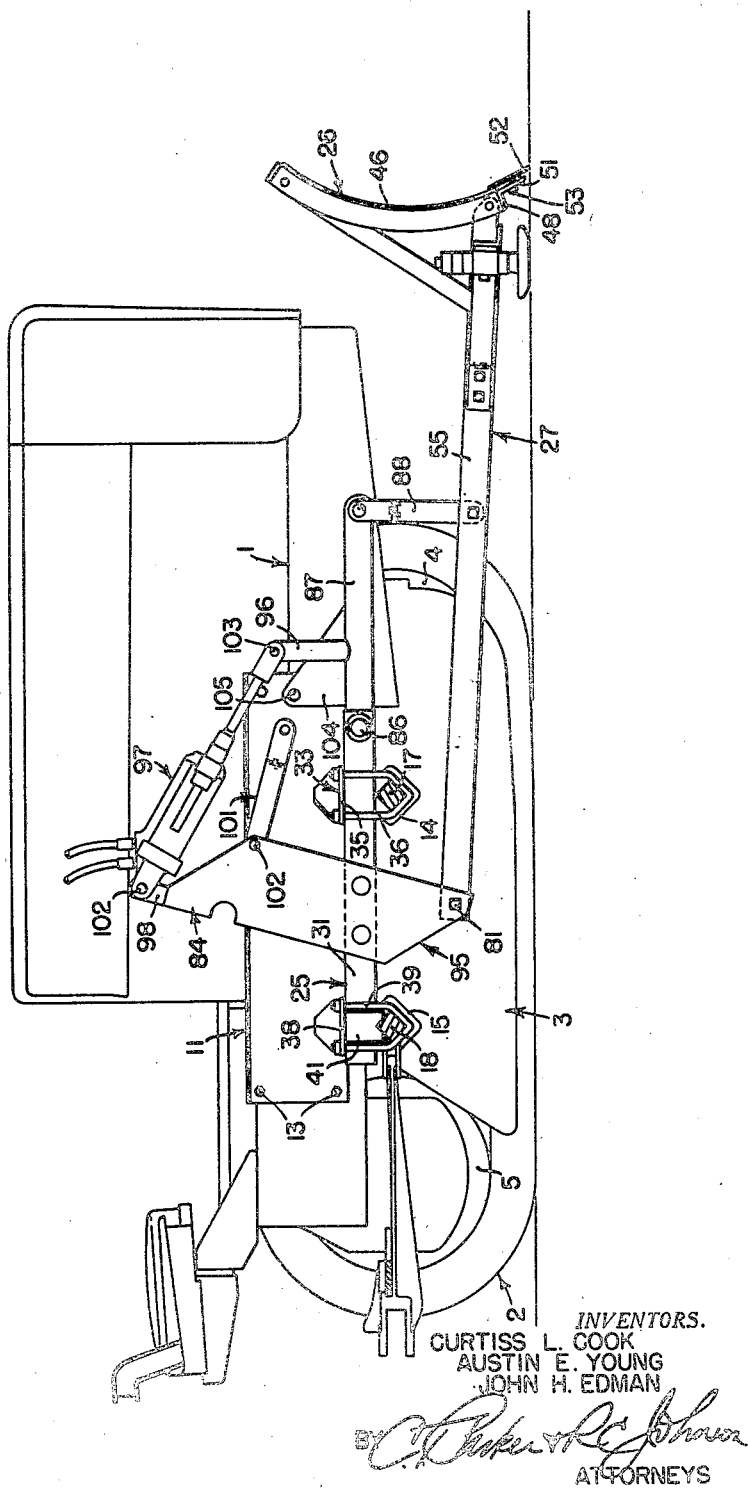

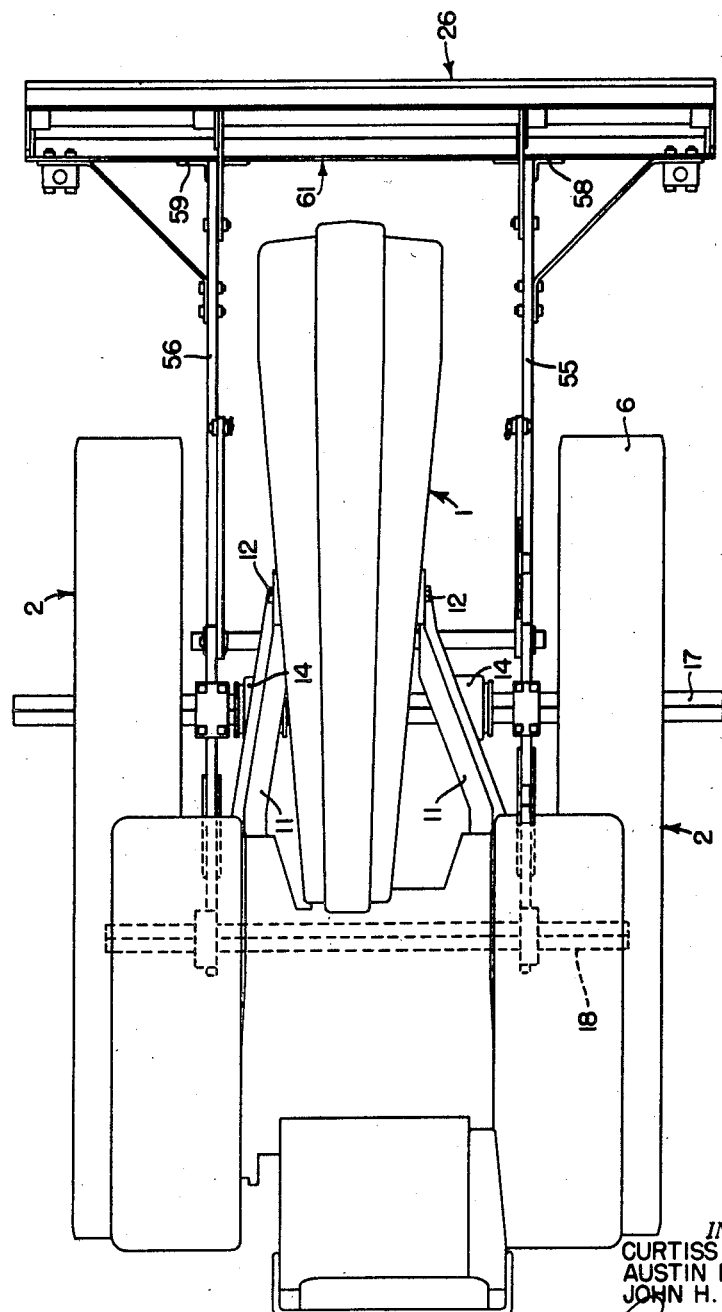

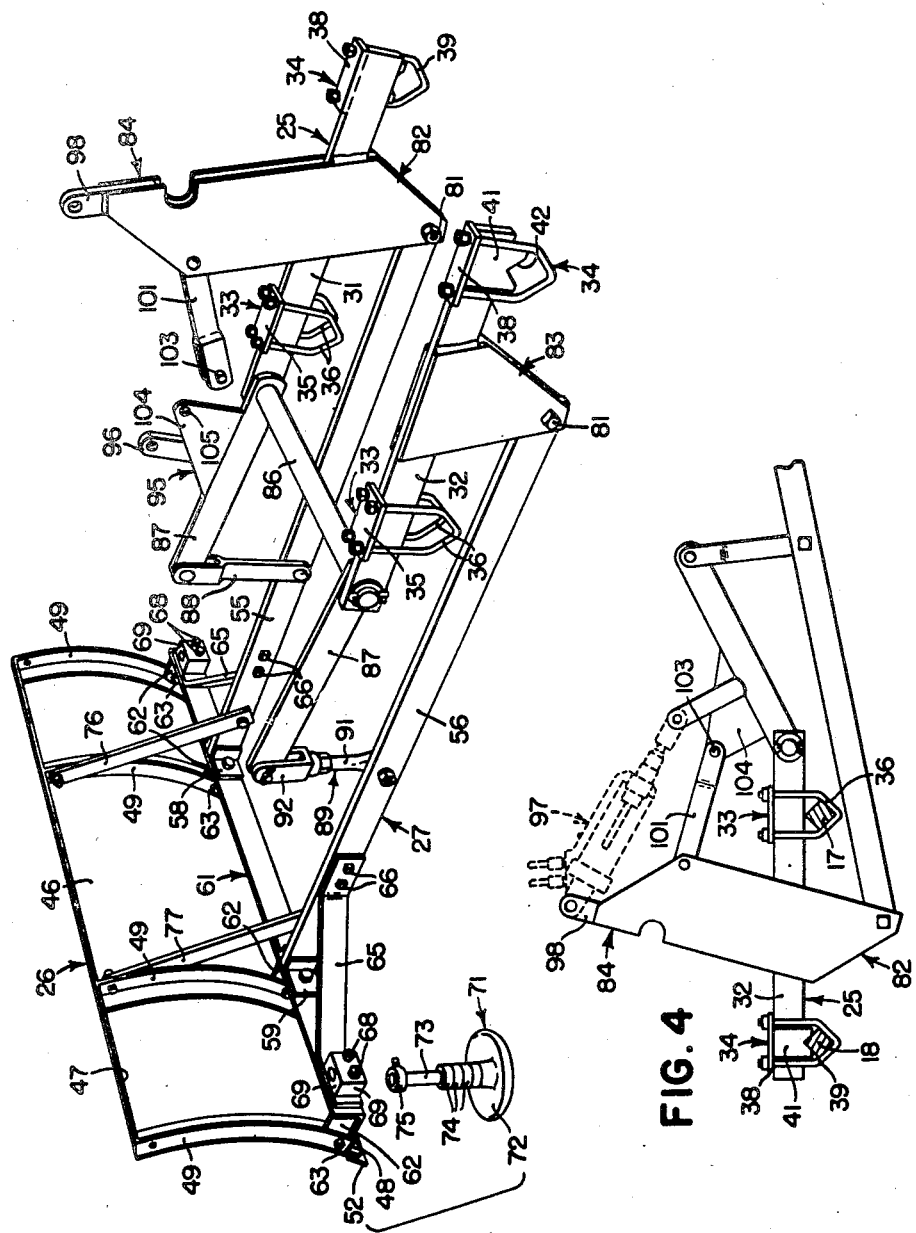

2,626,470

UNITED STATES PATENT OFFICE 2,626,470

BULLDOZER

Curtiss L. Cook and Austin E. Young, Syracuse, N. Y., and John H. Edman, Dubuque, Iowa, assignors, by mesne assignments, to Deere & Company, Moline, Ill., a corporation of Illinois Application June 30, 1950, Serial No. 171,282

3 Claims. (Cl. 37—144)

The present invention relates generally to agricultural implements of the earth-working type and is more particularly concerned with implements designed and constructed to be mounted on tractors of the crawler or track-laying type.

The object and general nature of the present invention is the provision of an earth-cutting and -moving implement adapted to be mounted on a track-laying tractor and so constructed and arranged as to avoid imposing any unusual loading or abnormal stresses on the tractor. More specifically, it is an object of this invention to provide means for mounting an earth-working or earth-moving blade on the tractor through side supports which are directly connected with the cross members by which the tractor body is carried on the track frames, and in this connection it is a further feature of this invention to provide for raising and lowering the blade without imposing any appreciable stress on the tractor parts.

A further feature of this invention is the provision of new and improved means for mounting the scraper blade of an earth-working implement on a tractor of the crawler or track-laying type, which means is so constructed and arranged as to lie generally between the track frames and the body of the tractor. A further feature of this invention is the provision of a new and improved blade frame for an implement of this type in which the connections between the blades and the blade frame are so constructed and arranged as to give the effect of a deep section which is generally in line with the pushing forces transmitted through the blade frame to the lower or cutting edge of the blade.

Still further, another feature of this invention is the provision of means to lock up the blade so as to permit the use of the hydraulic apparatus of the tractor for other tools without requiring removal of the earth-working implement from the tractor.

These and other objects and advantages will be apparent to those skilled in the art after a consideration of the following detailed description, taken in conjunction with the accompanying drawings, in which:

Figure 1 is a side view of a tractor and implement construction in which the principles of the present invention have been incorporated;

Figure 2 is a plan view of the implement shown in Figure 1;

Figure 3 is a perspective view of the blade frame and attachment frame, showing the parts substantially in their normal working position but, for purposes of clarity, disconnected from the tractor;

Figure 4 is a side view similar to Figure 1, showing the implement in its locked-up position, accommodating a disconnection of the tractor hydraulic ram unit to free the latter for other service.

Referring now to the drawings, particularly Figures 1 and 2, the track-laying tractor chosen for the purposes of illustrating the principles of the present invention comprises a longitudinally extending body 1 supported by and between a pair of laterally spaced, longitudinally extending traction units 2, one at each side of the tractor. Each traction unit comprises a track frame 3 and front and rear sprockets 4 and 5, over which articulated endless tracks 6 are mounted. The tractor body 1 includes a pair of laterally spaced, longitudinally extending frame members 11, one at each side of the tractor and each of which is secured at its forward and rearward ends to the tractor body 1, as at 12 and 13, the frame members 11 thus forming, in effect, an integral part of the tractor body, particularly so far as the present invention is concerned. Each of the tractor body members 11 is provided with a pair of laterally extending, fore and aft spaced apart sockets 14 and 15 in which a pair of longitudinally spaced, transversely extending supporting cross members 17 and 18 are fixed. The cross members 17 and 18 extend laterally outwardly at each side of the body of the tractor and are received in supporting relation by clamping brackets 21 or the like on the track frames 3.

The parts are so arranged that there is an appreciable space at each side of the tractor body between the latter and the associated traction unit, and we make use of the availability of this space to provide a simple and sturdy attachment frame to which a blade frame may be connected whereby there is no necessity for any attachment parts at the outer sides of the traction units and, additionally, the implement-attachment frame is connected directly with the cross members which support the tractor body on the traction units. By virtue of this construction, all stresses and strains incident to the use of apparatus of this kind are transmitted directly to the cross members and do not impose any undesirable or abnormal loads on the body of the tractor.

Referring now to the earth-cutting and -moving implement with which the present invention is more particularly concerned, the bulldozer in which the principles of the present invention have been embodied includes, in general, an attachment frame 25 and a transverse earth-working blade 26 carried by a blade or push frame 27. The attachment frame comprises right- and left-hand side support bars 31 and 32, each of which near its forward and rear ends carries clamping means 33 and 34. The clamps 33 are so arranged as to connect the bars 31 and 32 to the forward cross member 17. To this end, each of the clamping members 33 includes an upper clamping plate 35 apertured to receive the upper ends of a pair of U-bolts 36, the lower portions of which are shaped to engage the lower side of the associated cross frame member 17. Each of the rear clamping units 34 comprises a plate 38 fixed, as by welding, to the rear end of each of the side supports 31 and 32, the plates 38 being apertured to receive the upper ends of a U-bolt 39. Each clamping unit 34 also includes a vertical plate 41, also welded to the rear end of the associated side support bar, and having a downwardly extending notched portion 42 which is shaped to cooperate with the rear cross member 18 of the tractor. Preferably, the notched portion 42 is V-shaped where the rear cross member is a square bar arranged in a diagonal position, as shown in Figure 1. Thus, the rear cross member 18 is connected to the rear ends of the side supports 31 and 32 in such a way as to transmit the major portion of the forwardly directed forces. However, the forward clamping units 33 effectively and fixedly connect the forward ends of the supporting bars 31 and 32 to the forward cross member 17, whereby the latter members are fixedly and rigidly connected to the tractor cross members 17 and 18.

The blade unit 26 includes a forwardly facing concave blade section 46 secured, as by welding, at its upper and lower edges to upper and lower crossbars 47 and 48. The blade unit 26 also includes a plurality, preferably four, of vertical arcuate angles 49, the upper ends of which are welded to the bar or strip 47. The lower ends of the arcuate angles 49 are secure, as by welding, to the lower crossbar 48, which preferably is in the form of an angle having a lower forwardly facing flange 51 apertured so as to receive a blade shoe 52, the latter being connected to the flange 51 by a plurality of bolts 53.

The blade frame unit 27 includes a pair of push bars 55 and 56 which are disposed in laterally spaced apart relation, corresponding to the lateral spacing between the side supports 31 and 32. The forward ends of the push bars 55 and 56 are connected by a pair of angle clips 58 and 59 to a blade attachment angle 61 that extends laterally outwardly beyond the ends of the push bars 55 and 56 and carries a plurality of forwardly extending apertured lugs 62 welded to the angle member 61 at spaced points along the angle 61 corresponding to the spacing of the arcuate angles 49 of the blade unit 26. The lower portion of each of the blade angles 49 is apertured to receive a bolt or pivot 63 by which the blade unit 26 is connected to the blade attachment angle 61. The laterally outer portions of the latter member are reenforced by a pair of corner braces 65, the rear ends of which are secured, as by bolts 66, to the associated push bars 55 and 56 rearwardly of the forward ends thereof, and at their outer ends the corner braces 65 are connected to the end portions of the attachement angle 61 by a pair of elongated bolts 68. The latter bolts are also utilized for the purpose of securing a pair of vertically apertured depth shoe blocks 69 to the end portions of the attachment angle 61. Depth shoes 71 are carried by the blocks 69, each depth shoe unit 71 including a generally spheroidal shoe 72 to which a vertically extending shank 73 is fixed. The shank 73 is adapted to pass through the aperture in the associated depth shoe block 69, the shank 73 having such length as to provide for the disposition of one or more spacing collars 74 about the shank 73 either above or below the associated block 69, whereby to secure a vertical adjustment of the depth shoe relative to the associated blade and frame structure. A set screw collar 75 is fixed to the upper end of each depth shoe shank 73 for the purpose of holding the parts in assembled relation. The blade 46 is reenforced and held against rearward displacement at its upper edge portion by a pair of braces 76 and 77 which are bolted at their upper ends to the upper portions of the intermediate blade angles 49 and at their lower ends to the push bars 55 and 56 rearwardly of the associated attaching clips 58 and 59 but forwardly of the points where the rear portions of the corner braces 65 are connected, at 66, to the push bars 55 and 56. The rear ends of the push bars 55 and 56 are pivotally connected, as by pivot bolts 81, to a pair of depending brackets 82 and 83 which are fixed at their upper portions to the generally intermediate portions of the side supports 31 and 32 between the cross member clamping units 33 and 34. The right-hand bracket 82 is extended upwardly, as at 84, for a purpose which will be explained later.

The forward ends of the side support bars 31 and 32 are apertured to rockably receive a cross shaft 86 to each end portion of which the rear end of a lifting arm 87 is rigidly connected, as by welding, the two arms 87 and the rockshaft 86 forming a rigid structure. The right-hand arm 87 is connected by a link 88 to the associated right-hand push bar 55, and the left-hand arm 87 is connected to the left-hand push bar 56 by an adjustable link 89, which is made up of a lower threaded member 91 pivotally connected to the push bar 56 and an associated yoke 92 which is pivoted to the outer end of the left-hand lifting arm 87.

Secured to the right-hand arm 87 and extending upwardly therefrom is a bracket structure 95 which includes an apertured lug 96 that is adapted to receive the front end of a hydraulic ram 97 which normally forms a part of the tractor. The rear end of the ram 97 is connectible to an apertured lug 98 which is carried by the upper portion 84 of the right-hand attachment frame bracket 82. As best shown in Figure 1, extension and retraction of the hydraulic unit 97 acts through the lifting crank structure 86, 87 to raise and lower the push frame 27 about its pivotal connection 81 with the side supports 31 and 32.

For the purpose of locking up the blade and holding it in inoperative position so as to permit the disconnection of the hydraulic unit 97 from the apertured lugs 96 and 98 so as to be available for other services, we provide a link 101 pivotally connected, as at 102, to the upper bracket extension 84. The lock-up link 101 is apertured at its front end and is connectible through a quick-detachable pin 103 with an apertured lug 104 that forms a part of the lifting frame bracket 95. The parts are arranged so that when the cylinder is fully retracted the pin 103 may be easily inserted into an opening 105 in the part 104 (Figure 1) for connecting the lock-up link 101 to the lifting crank unit 86, 87. Then by slightly extending the unit 97, the pivots connecting the latter unit to the lugs 96 and 98 may easily be removed. The hydraulic unit 97 is normally connected to the power lift mechanism of the tractor through long hoses 105 and 106.

While we have shown and described above the preferred structure in which the principles of the present invention have been incorporated, it is to be understood that our invention is not to be limited to the particular details shown and described above, but that, in fact, widely different means may be employed in the broader aspects of our invention.

What we claim, therefore, and desire to secure by Letters Patent is:

1. An agricultural implement adapted to be mounted on a tractor of the track-laying type having a tractor body carrying a pair of transversely extending fore and aft spaced apart cross members fixed rigidly to the tractor body and a pair of track-carrying frames fixed rigidly to the end portions of said cross members with a space between the tractor body and the track frames, said implement comprising a pair of side supports disposable, respectively, in said spaces, means for fixing said side supports rigidly to said cross members laterally outwardly of the tractor body and laterally inwardly of said track frames, a frame including a pair of push bars extending generally rearwardly underneath said side supports and pivoted at their rear ends to said side supports, a cross shaft rockably mounted in the forward ends of said side supports, a pair of arms fixed to said cross shaft and operatively connected with said push bars for raising and lowering the latter, and means connected with said cross shaft for rocking the latter and said arms so as to raise or lower the forward end of said frame.

2. An agricultural implement adapted to be mounted on a tractor of the track-laying type having a tractor body carrying a pair of transversely extending, fore and aft spaced apart cross members and a pair of track-carrying frames fixed to the end portions of said cross members with a space between the tractor body and the tracks and track frames, said implement comprising a pair of side supports disposable, respectively, in said spaces, means for fixing said side supports to said cross members laterally outwardly of the tractor body and laterally inwardly of said track frames, with the forward ends of said side supports extending forwardly beyond the forward cross member and apertured, a transverse shaft rockably mounted in the apertures in the forward ends of said side supports, a pair of lift arms fixed at their rear ends to said shaft adjacent the ends of the latter and extending forwardly therefrom, said arm being swingable together with said shaft, a pair of push bars pivotally connected at their rear ends with said side supports, an operating unit at the forward ends of said push bars, and means connecting the outer ends of said arms with said push bars for raising and lowering the latter and said frame by rocking movement of said transverse rockably mounted shaft.

3. An agricultural implement adapted to be mounted on a tractor of the track-laying type having a tractor body carrying a pair of transversely extending, fore and aft spaced apart cross members and a pair of track-carrying frames fixed to the end portions of said cross members with a space between the tractor body and the tracks and track frames, said implement comprising a pair of side supports disposable, respectively, in said spaces, means for fixing said side supports to said cross members laterally outwardly of the tractor body and laterally inwardly of said track frames, a pair of depending brackets fixed to said side supports and adapted to extend downwardly between said cross members, a pair of push bars pivotally connected at their rear ends to said depending brackets and lying in said spaces substantially in the vertical planes, respectively, of said side supports, means carried at the forward ends of said side supports and connected with said push bars for raising and lowering the latter, one of said depending brackets including an upper extension, and means acting between said extension and said raising and lowering means for operating the latter.

CURTISS L. COOK.
AUSTIN E. YOUNG.
JOHN H. EDMAN.

REFERENCES CITED

The following references are of record in the file of this patent:

UNITED STATES PATENTS

| Number | Name | Date |
| --- | --- | --- |
| 1,918,771 | Meyer | July 18, 1933 |
| 1,976,597 | Bird | Oct. 9, 1934 |
| 2,190,346 | Austin | Feb. 13, 1940 |
| 2,239,943 | Sword | Apr. 29, 1941 |
| 2,344,584 | Austin | Mar. 21, 1944 |